Sept. 13, 1949.　　　　G. L. LARISON　　　　2,481,521
SUSPENSION FOR VEHICLES
Original Filed Nov. 30, 1943　　　　2 Sheets-Sheet 1
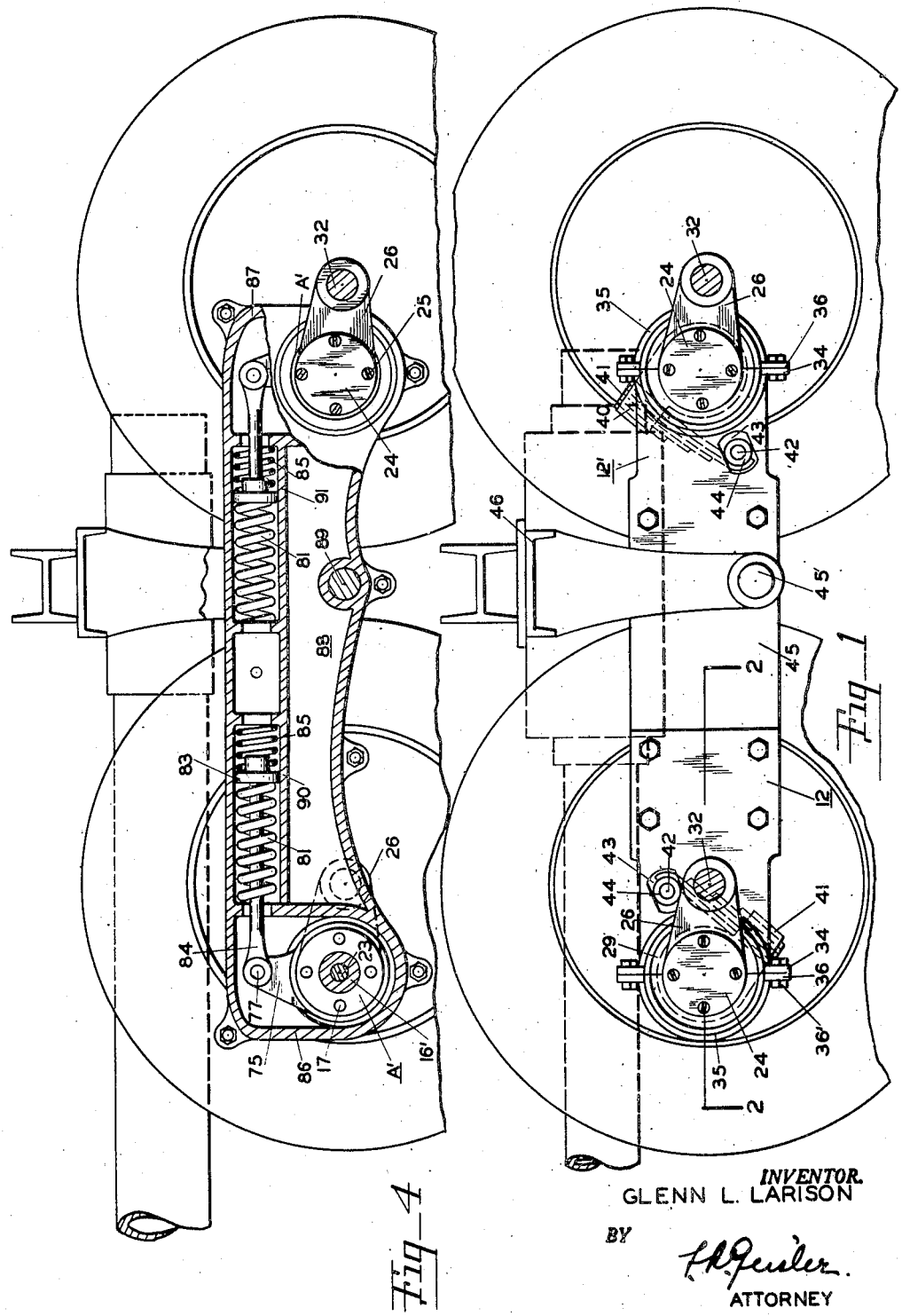
INVENTOR.
GLENN L. LARISON
BY
ATTORNEY Sept. 13, 1949.  G. L. LARISON  2,481,521
SUSPENSION FOR VEHICLES
Original Filed Nov. 30, 1943  2 Sheets-Sheet 2
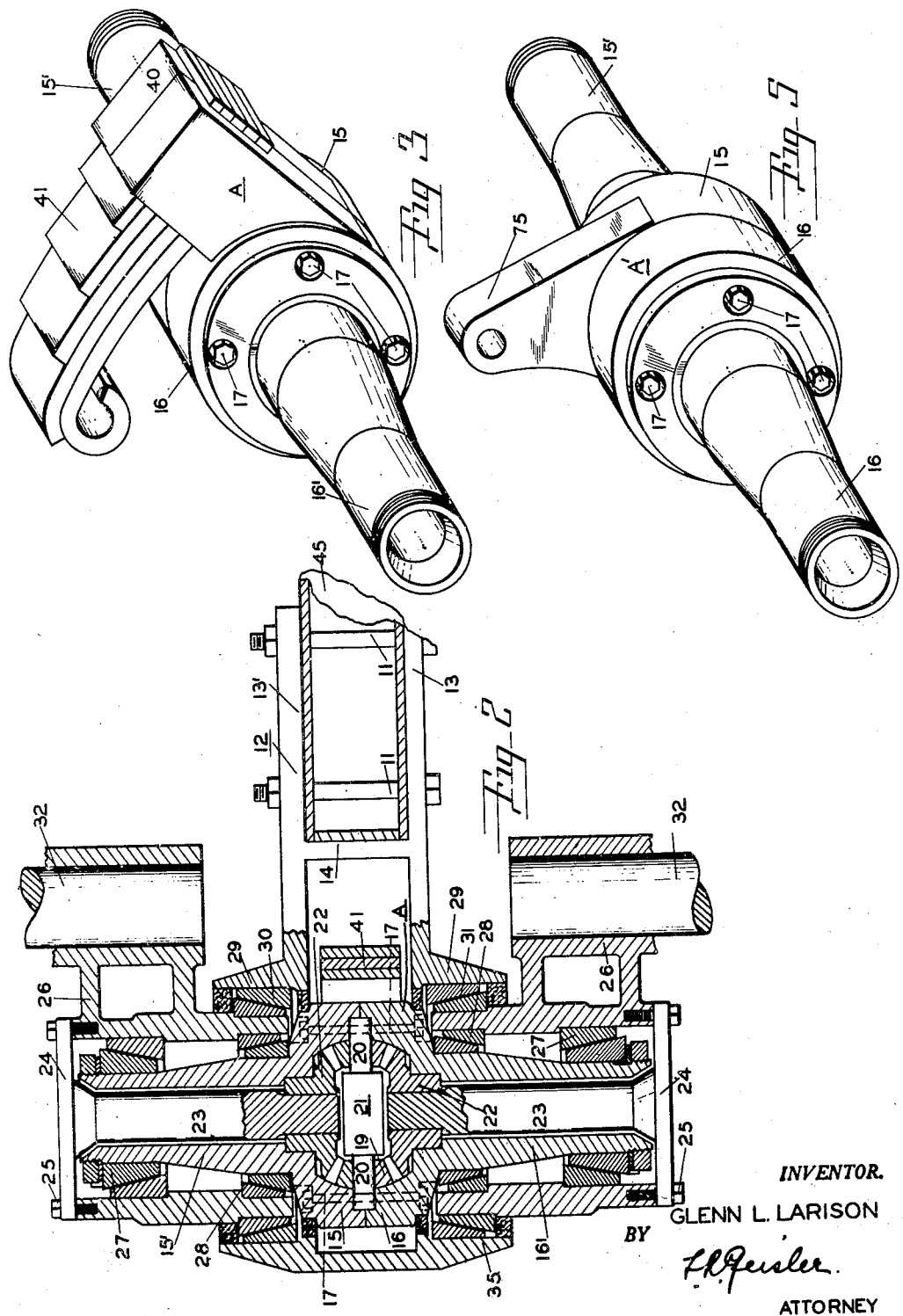
INVENTOR.
GLENN L. LARISON
BY
ATTORNEY Patented Sept. 13, 1949

2,481,521

UNITED STATES PATENT OFFICE 2,481,521

SUSPENSION FOR VEHICLES

Glenn L. Larison, La Grande, Oreg., assignor to Larison Compensating Axle Corporation, a corporation of Oregon Original application November 30, 1943, Serial No. 512,352, now Patent No. 2,417,206, dated March 11, 1947. Divided and this application October 7, 1946, Serial No. 701,707

2 Claims. (Cl. 280—104.5)

This application is a divisional application, divided from my co-pending application, Serial No. 512,352, filed November 30, 1943, entitled Vehicle wheel suspension, subsequently matured into U. S. Letters Patent No. 2,417,206, issued under date of March 11, 1947.

The present invention relates to vehicle wheel suspension in which the wheels are mounted in pairs and interconnected by compensating mechanism so that the load supported by the two wheels of the pair will be divided equally between them under all normal conditions.

More specifically, the present invention relates to a vehicle suspension in which walking beams are employed and in which two pairs of wheels are mounted on each walking beam with the wheels of each pair interconnected as previously mentioned.

The object of this invention is to provide a vehicle suspension embodying a walking beam of rigid construction in which the load supported by the walking beam will be equally distributed among two pairs of wheels mounted on the walking beam, and in which an improved and simplified compensating mounting for the wheels of each pair will divide the load between them and will, in addition, cushion the shocks transmitted to the walking beam from the wheels.

A further object of this invention is to provide an improved cushioning and compensating mechanism which will dispense with the necessity of the usual vehicle springs or the necessity for a spring walking beam, and in which the compensating and cushioning mechanism will be enclosed in order to protect the same from dirt and grit.

In the accompanying drawings:

Fig. 1 is a side elevation of a vehicle walking beam showing the mounting for a pair of wheels at each end of the walking beam, with the near side wheels removed for the sake of clarity;

Fig. 2 is a horizontal section through the end of the walking beam taken on line 2—2 of Fig. 1; and Fig. 3 is a view, in perspective, of the rotatable housing for the compensating mechanism for one of the interconnected pairs of wheel-carrying assemblies, this being shown removed from the walking beam;

Fig. 4 is a side elevation, partly in section, of a modified walking beam showing another way in which the compensating mechanisms and wheel assemblies may be mounted; and Fig. 5 is a view, in perspective, of the rotatable housing for one of the compensating mechanisms in the vehicle suspension shown in Fig. 4, the same being shown entirely removed from the walking beam.

Referring first to Fig. 1, a walking beam 45 is pivotally connected at 45' to the vehicle frame 46. A pair of wheel-carrying arms are mounted at each end of the walking beam 45. The pivotal point 45' of the walking beam, as apparent from Fig. 1, is not at the longitudinal center of the walking beam itself since the two pairs of wheel-carrying arms 26 extend in the same direction in accordance with the teaching of my United States Letters Patent No. 2,209,528 issued under date of July 30, 1940, and entitled "Vehicle wheel suspension." The distance of the wheel-carrying spindles 32 of both pairs of wheel-carrying arms 26 from the pivotal point 45', however, is substantially the same.

A suitable mounting bracket 12 (see Fig. 2) is secured to each end of the walking beam 45 by means of bolts 11, or by welding. Each bracket 12 includes a pair of vertical side plates 13, 13' joined by an integral vertical cross plate 14. Each side plate 13, 13' terminates in a semi-cylindrical, outwardly-extending flange 29. The semi-cylindrical flanges 29 have vertically-extending ears 34 (Fig. 1) at their ends to accommodate bolts 36'.

A semi-cylindrical cap 35 extends around the outer end of the bracket 12. This cap 35 has the same internal diameter as the semi-cylindrical flanges 29, and also has a corresponding pair of vertical ears 36 at top and bottom through which the bolts 36' also extend, thereby securing the cap 35 in place.

A composite rotatable housing A (see Fig. 3) is carried within each bracket 12. The housing A comprises two identical sections 15 and 16 (see also Fig. 2) secured together by bolts 17. Each of these sections has an elongated hub 15' or 16' respectively. A wheel-spindle-carrying arm 26 is rotatably journaled on each elongated hub 15' or 16' by bearings 27 and 28. The arms 26 are also journaled within the annular rims formed by the flanges 29 and the cap 35 by means of bearings 30 and 31. A wheel spindle 32 is secured to each arm 26. The composite rotatable housing A has a socket 40 (Fig. 3) on the exterior of the enlarged central portion in which the end of a short leaf spring 41 is fixedly secured. The opposite end of leaf spring 41 is attached to a transversely extending pin 42 (Fig. 1). Rollers 44 are mounted on the outer ends of the pin 42 and are adapted to move in the axially alined slots 43 in the side plates 13, 13' of the bracket 12. The purpose of the spring 41 is to control the rotational movement of the composite housing A.

A differential mechanism is located on the inside of the composite rotatable housing A. This differential mechanism is shown in Fig. 2. A plurality of differential pinions 19 are journaled on stub shafts 20 which are disposed about a central support 21 and secured between the sections of the rotatable housing A so that their positions are fixed. A pair of differential gears 22 mesh with the pinions 19 and are secured to shafts 23 which extend through the elongated hubs 15' and 16' of the composite housing A. The outer ends of shafts 23 terminate in enlarged circumferential flanges 24 with which the wheel-carrying arms 26 are connected by cap screws 25 or other suitable means.

The manner in which each pair of wheel-carrying assemblies and the interconnecting compensating means function at each end of the walking beam will now be apparent from Figs. 1 and 2. Assuming, for the sake of illustration, that the walking beam remains stationary, then if one of the two wheels of the pair is raised the other wheel will be lowered a corresponding amount, due to the action of the differential mechanism connecting the two wheel-carrying arms and located within the rotatable housing A. If both wheels are raised simultaneously (assuming that the corresponding end of the walking beam is not raised), the rotatable housing A would have to be rotated slightly against the force of the leaf spring 41. The leaf spring 41 thus acts to cushion the shock received from either or both wheels. Thus the pair of wheel-carrying assemblies at each end of the walking beam 45 divide the load at that end of the walking beam equally between the two wheels and tend to absorb sudden shocks delivered to the walking beam from either or both wheels of the pair, and, since the walking beam does not remain stationary but is free to pivot on its bearing, the total effect is to divide the load at that side of the vehicle equally among the four wheel-carrying assemblies.

Referring to the modified construction illustrated in Figs. 4 and 5, in place of the composite rotatable housing A shown in Fig. 3, a slightly modified rotatable housing A' is used with each pair of wheel-carrying assemblies. This rotatable housing A' is similar to the housing A except that a rigid arm 75 (Fig. 5) extends from one section 15 of the rotatable housing.

The rotatable housings A' are mounted at ends of the composite walking beam 88 (Fig. 4). The walking beam is split longitudinally and the two halves are secured together by suitable bolts. The composite walking beam is formed with end sections 86 and 87 which constitute brackets or enclosed compartments through which the differential mechanisms and rotatable housings A' extend. The composite walking beam also has a pair of cylindrical chambers 90 and 91 in each of which are housed a compression spring 81 and a lighter recoil-cushioning spring 85 cooperating with a piston 83 attached to the rod 84. The rods 84 in turn are connected to the arms 75 of the composite rotatable housings A' by means of suitable pins 77. The compression springs 81 are engaged by the pistons 83 and thus take the place of the leaf springs of Figs. 1, 2 and 3. The lighter and shorter recoil-cushioning springs 85 are placed between the pistons 83 and a shoulder at the other end of each cylinder. The composite walking beam 88 is pivotally mounted with respect to the vehicle frame at 89.

It will be apparent that the two pairs of wheel-carrying assemblies, their interconnecting differential mechanisms, and the composite walking beam of Fig. 4, function in exactly the same manner as previously described to divide the load at one side of the vehicle equally among the four wheels and that the shocks transmitted from any or all of the wheels are cushioned. This modified walking beam construction enables the springs and associated members to be entirely enclosed in a sealed housing, thus completely protecting the same from dirt and grit and simplifying the problem of lubrication since the housing can be filled with oil.

Further modifications could of course be made in the construction of the walking beam, in the mounting of the wheel-carrying arms, and in the mounting of the differential mechanisms for each pair of wheel assemblies. But it is essential for the accomplishment of my objects that each pair of wheel assemblies be interconnected by a differential mechanism, that the differential mechanism be rotatable as an entire unit, and that such rotation be properly spring controlled.

I claim:

1. In a vehicle, a walking beam, a pair of wheel-carrying assemblies hinged near one end of said walking beam for movement in parallel vertical planes, a differential mechanism carried by said walking beam and mounted for rotational movement as an entire unit on a horizontal axis, resilient means controlling said rotational movement of the differential mechanism as an entire unit, said wheel-carrying assemblies connected to said differential mechanism, whereby movement of one of said wheel-carrying assemblies with respect to said walking beam will cause relative movement of the other wheel-carrying assembly in the opposite direction with respect to said walking beam and movement of both wheel-carrying assemblies in the same direction with respect to the walking beam will cause said differential mechanism to be rotated as an entire unit against the force of said resilient means, a second pair of wheel-carrying assemblies hinged near the other end of said walking beam for movement similarly in parallel vertical planes, a second differential mechanism carried on said walking beam and mounted for rotational movement as an entire unit on a horizontal axis, resilient means controlling said rotational movement of said second differential mechanism, said second pair of wheel-carrying assemblies connected to said second differential mechanism.

2. In a vehicle suspension, a walking beam, a composite supporting housing mounted near one end of said walking beam for rotational movement on a horizontal axis, a pair of wheel-spindle assemblies rotatably carried by said housing, compensating mechanism carried by said housing and connected to said housing, each of said wheel-spindle assemblies connected to said compensating mechanism, said compensating mechanism so constructed and arranged that upward movement of one wheel-spindle assembly will cause relative opposite movement of the other wheel-spindle assembly, but said compensating mechanism so connected with said supporting housing that movement of both assemblies in the same direction will cause said supporting housing to be rotated with said assemblies, resilient means attached to said housing controlling the rotation of said housing, a second composite supporting housing mounted near the other end of said walking beam, a second compensating mechanism carried by said second housing and connected thereto, a second pair of wheel-spindle assemblies rotatably carried by said second housing and connected to said second compensating mechanism, and resilient means attached to said second housing controlling the rotational movement of said second housing.

GLENN L. LARISON.

REFERENCES CITED

The following references are of record in the file of this patent:

UNITED STATES PATENTS

| Number    | Name     | Date          |
|-----------|----------|---------------|
| 2,194,323 | Peterman | Mar. 19, 1940 |
| 2,286,576 | Ronning  | June 16, 1942 |